J. W. CHALLONER & H. T. SHIPLEY.
HAY AND GRAIN LOADER.
APPLICATION FILED SEPT. 22, 1909.
990,108.
Patented Apr. 18, 1911.
3 SHEETS—SHEET 1.
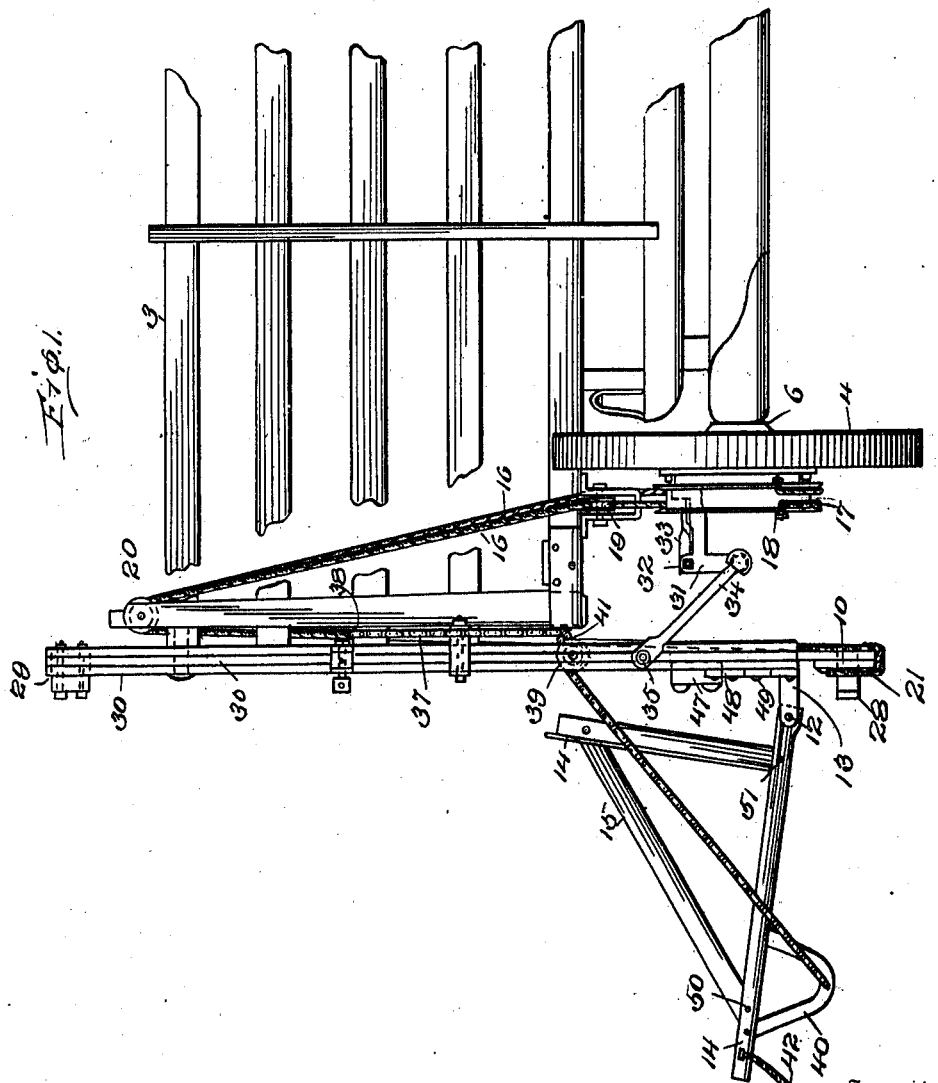

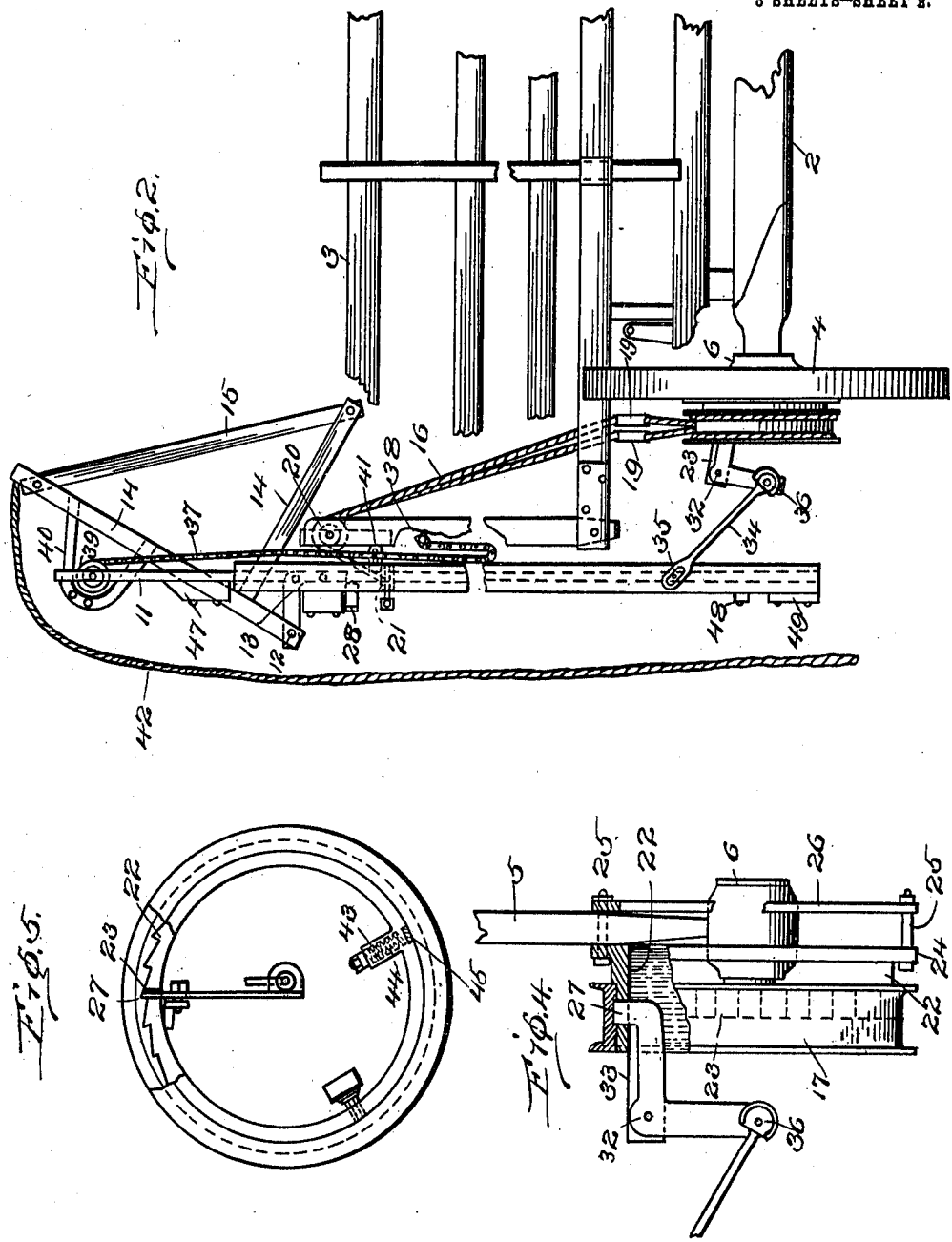

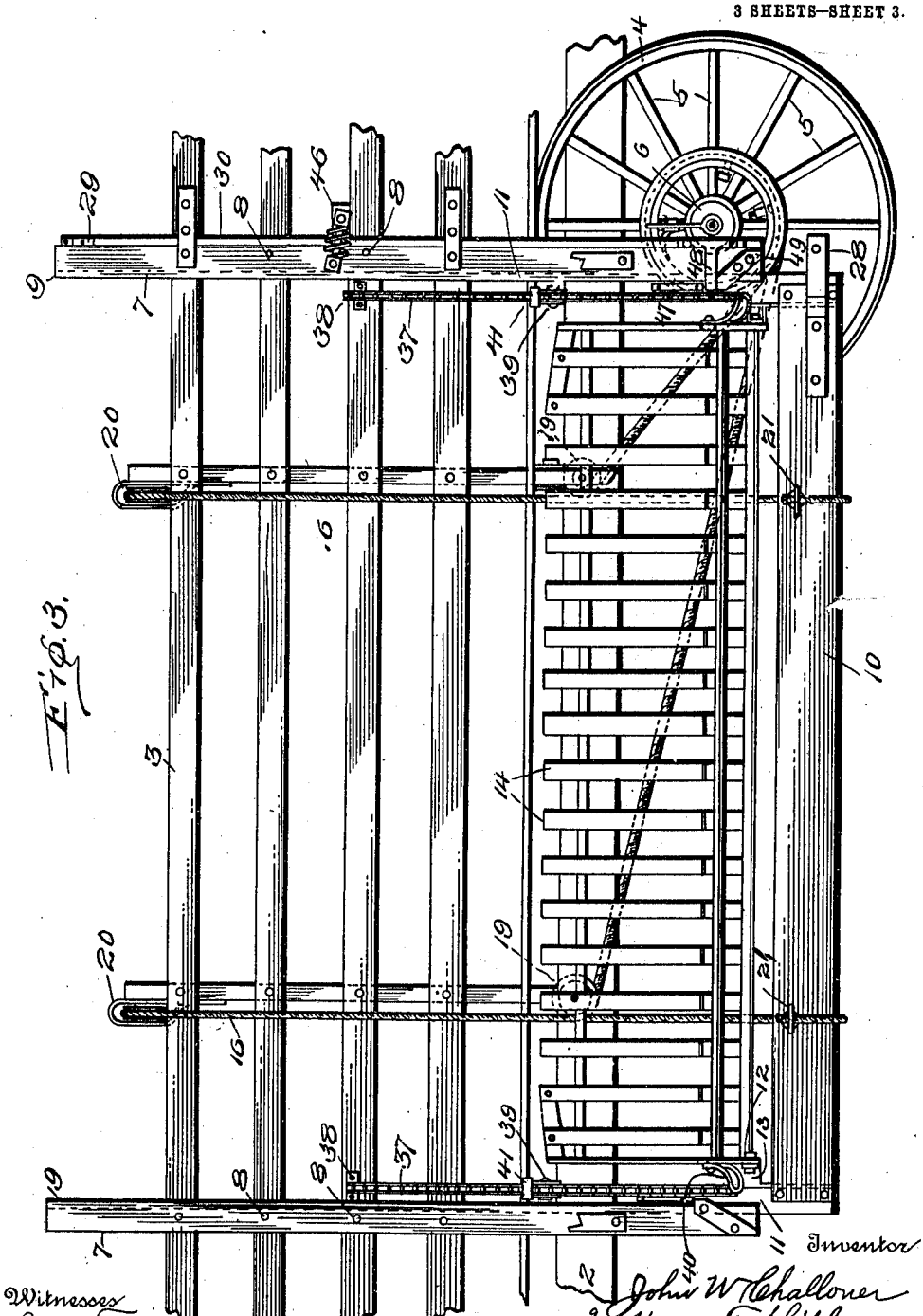

UNITED STATES PATENT OFFICE.

JOHN W. CHALLONER AND HENRY T. SHIPLEY, OF OSHKOSH, WISCONSIN, ASSIGNORS OF ONE-FOURTH TO CLARENCE R. BLAKELY, OF OSHKOSH, WISCONSIN.

HAY AND GRAIN LOADER.

990,108.  Specification of Letters Patent.  Patented Apr. 18, 1911.

Application filed September 22, 1909. Serial No. 518,972.

*To all whom it may concern:*

Be it known that we, JOHN W. CHALLONER and HENRY T. SHIPLEY, citizens of the United States, residing at Oshkosh, in the county of Winnebago and State of Wisconsin, have invented certain new and useful Improvements in Hay and Grain Loaders, of which the following is a specification.

Our invention relates to hay or grain loaders such as are attached to a wagon and load from the side.

Our invention is adapted to be attached to the side of a wagon and the operating power is conveyed from the traction of one of the wheels of the wagon.

Our invention is preferably used in connection with a wagon having a rack, to the side of which the frame of the loader is attached.

One of the objects of our invention is to provide a light and durable elevator for the purpose of raising hay or grain to the top of the rack at the side.

A further object of our invention is to operate said elevator from the power furnished by the traction of one of the wheels as the wagon is hauled along.

A further object of our invention is to furnish a basket in which the hay or grain is deposited near the ground and which is adapted to be dumped automatically when raised to the top of the rack, and to throw the contents of the basket into the rack.

A further object of our invention is to provide a convenient safe and effective means of returning the basket to the bottom of the elevator near the ground and readjusting the mechanism for another operation.

The entire operation of said mechanism and loading of the basket can be performed by one person who is ordinarily the driver of the vehicle.

In the accompanying drawing Figure 1 represents a rear view of our invention with the basket down, Fig. 2 represents a rear view with the basket at the top and dumped, Fig. 3 represents a side view of our invention, Fig. 4 is a rear view in detail of the drum a portion being cut away to show connections in section, Fig. 5 is a side view in detail of the drum and pawl a portion of the casing being cut away.

Referring to the drawing by numerals 2 represents an ordinary farm wagon, upon which is mounted a rack, 3 of ordinary construction, 4 represents one of the rear wheels of the wagon, 5, 5, 5 etc. the spokes and 6 the hub of the wheel.

7, 7 represent upright posts bolted to the slats of the rack 3 at 8, 8, 8 etc. and provided with slots or ways, 9, 9 in which the basket-supporting frame travels, said frame consists of the cross-bar 10 and the stanchions 11, 11. The basket rocks upon pivotal connections 12, 12, made to lugs 13, 13 extending from the stanchions 11, 11.

The basket consists of two slatted frames 14, 14 arranged at right angles to each other, and held in normal position by the side braces 15, 15.

The elevator ropes, 16, 16 wind around the drum 17 being attached to the drum at 18, 18 and pass through sheaves 19, 19 and upwardly and through the sheaves 20, 20 then down beneath the beam 10 being attached to the beam at 21, 21.

The drum 17 consists of an interior part 22 which is clamped to the spokes 5, 5 by means of bolts 25, 25 etc. passing through the inside disk 26 and the flange 24 integral with the part 22. The revolution of the wagon wheel revolves the member 22 which is surrounded by and supports the outer drum which has ratchet teeth 23 formed on the interior periphery thereof. The outer drum rides the inner member without turning until pawl 27 engages the ratchet 23. When the pawl is in engagement, the elevator ropes are caused to wind upon the drum and elevate the frame carrying the basket. When the frame reaches the top, the brace 28 engages the lug 29 attached to the perpendicularly arranged bar 30 and raises it slightly to throw the pawl out of engagement. The pawl is integral with the bell-crank lever 31 which rocks upon the pivot 32 attached to the lug 33 extending from the inside member 22. The link 34 is pivotally connected with the bar 30 at 35 and the arm of the bell-crank lever by the universal joint 36.

The chains 37, 37 are secured to one of the slats of the rack at 38, 38 and pass downwardly through sheaves 39, 39 attached to the stanchions 11, 11, and connect with the braces 40, 40, attached to the basket. These chains have a double function. They act to hold the basket at a proper angle when down and to dump the basket at the top. Stops 41, 41 are provided at the proper locality upon the chains which impinge against the sheave supports at 39, 39 and hold the basket at the proper angle when down. As the basket supporting frame is raised the chains 37, 37 are gradually drawn taut and then drawn through the sheaves 39, 39 gradually turning the basket until the top is reached and the basket is in the position shown in Fig. 2 and the load is permitted to slide into the rack. Then the brace 28 engages the lug 29 and throws the pawl 27 out of engagement with the ratchet. After the operation of the machine the basket being in the position shown in Fig. 2 and overbalanced at the top, and the pawl out of engagement, the wagon may be driven along to the next place for loading, such as a shock of grain or corn or a windrow of hay, the driver walking at the side. When the driver desires to again load the basket he pulls downwardly upon the rope 42 until the overbalance is overcome and the elevator descends by gravitation. When near the bottom the projection 47 attached to the stanchions 11 strikes the lug 48 attached to the bar 30 and carries it down until it rests upon the brace 49. The downward movement of the projection 47 carrying the bar 30 operates the bell-crank lever 31 to again throw the pawl 27 into engagement with the ratchet-wheel 23. When the wagon is again started the mechanism will be operative to raise the elevator. The tension of the spring 46 is only sufficient to retain the bar 30 in either its raised position or lowered position until the other mechanisms operate the bar.

43 represents a friction drag consisting of a tension spring 44 adapted to press the strip of friction material 45 against the outer drum. The friction retards the revolution of the drum when the basket descends by gravity after the basket has been emptied at the top. The friction thereby prevents too rapid descent of the basket and serves to avoid injury and breakage.

The basket may be folded when not in use by unhooking the braces 15, 15 at 50 and folding the two parts 14, 14 together. A hinge for this purpose is provided at 51.

Having thus described our invention what we claim is:

1. In a hay loader, the combination with a wagon, of an elevator, means for conveying power from one of the wheels of said wagon to said elevator for raising the elevator, means for securing said elevator to said wagon, a hay receiving basket carried by the elevator, means for dumping the contents of the basket into the wagon at the top thereof, means for returning said basket to is normal lowered position, means for braking the lowering of the basket, and means operable by said basket for cutting off power from said wagon when the basket is in its raised position, and for connecting the power when the basket has been moved to its lowered position.

2. In a hay loader, the combination with a wagon, of a drum rigidly secured to one of the wheels of said wagon, a loosely mounted winding drum arranged on said first mentioned drum formed with teeth on its inner periphery, a pawl pivotally connected with said first mentioned drum and arranged to engage the teeth on the inner periphery of said winding drum, an elevator, means for connecting said winding drum with said elevator for raising the elevator when said pawl is in engagement with the teeth on the inner periphery of said winding drum and said wagon has been moved, and means operable by said elevator for automatically moving said pawl out of engagement with the teeth on the inner periphery of said winding drum after said elevator has been raised to its highest position for disconnecting said drums.

3. In a hay loader, the combination with a vehicle, of a power mechanism secured to one of the traction wheels thereof, a drum loosely mounted on said power mechanism, a clutch for connecting said power mechanism and said drum, an elevator, a stop projecting therefrom, cables connecting said elevator and said drum, whereby said elevator is raised when said drum is rotated, a reciprocating bar associated with said elevator and adapted to be raised by said stop when the elevator has been raised, and means connecting said reciprocating bar with said clutch for disconnecting the clutch when the reciprocating bar has been elevated.

4. In a hay loader, the combination with a vehicle, of a power member connected with one of the wheels thereof, a drum loosely mounted on said power member, an elevator, means connecting said drum and said elevator for transmitting power from said drum to said elevator for raising said elevator, a clutch for connecting said drum and said power member, means operable by said elevator for connecting and disconnecting said clutch, and a resilient friction member mounted on said power member and engaging said drum for retarding the movement thereof when said elevator is being lowered.

5. In a hay loader, the combination with a wagon, of a drum connected with one of the wheels of the wagon, an elevator, means for connecting said drum with said elevator for raising the elevator, a clutch mechanism for connecting said drum with one of the wheels of said wagon, a reciprocating bar connected with said clutch mechanism, a stop secured to said reciprocating bar, and means projecting from said elevator for engaging said stop when the elevator has been raised to its extreme upper position for moving said bar longitudinally, whereby movement will be conveyed to said clutch mechanism for causing the same to disconnect said drum from said wheel.

In testimony whereof we affix our signatures, in presence of two witnesses.

JOHN W. CHALLONER.
HENRY T. SHIPLEY.

Witnesses:
ANNE CLEARLAND,
F. A. FULLER.

Copies of this patent may be obtained for five cents each, by addressing the "Commissioner of Patents, Washington, D. C."